United States Patent [19]
Tompkins

[11] 3,739,818
[45] June 19, 1973

[54] WIRE STRIPPING APPARATUS AND METHOD

[75] Inventor: Robert Van Fleet Tompkins, North Palm Beach, Fla.

[73] Assignee: RCA Corporation, New York, N.Y.

[22] Filed: Nov. 11, 1971

[21] Appl. No.: 197,831

[52] U.S. Cl. .............................. 140/147, 140/149
[51] Int. Cl. ............................................. B21f 1/02
[58] Field of Search .............. 140/147, 149; 72/88, 72/89, 90, 91, 92, 93; 81/9.51

[56] References Cited
UNITED STATES PATENTS

| | | |
|---|---|---|
| 3,602,270 | 8/1971 | Disher et al. .................... 140/147 |
| 2,929,286 | 3/1960 | Blakely ............................... 81/9.51 |
| 2,268,820 | 1/1942 | Hannan............................... 81/9.51 |
| 2,170,672 | 8/1939 | Anderson............................ 81/9.51 |
| 562,778 | 6/1896 | Wootton et al........................ 72/90 |

Primary Examiner—Lowell A. Larson
Attorney—Edward J. Norton

[57] ABSTRACT

To facilitate the removal of a length of covering of a wire or wires, an apparatus is provided which both squeezes and rotates the wire or wires between two opposed facing wire gripping surfaces which translate with respect to each other so as to loosen the covering.

12 Claims, 19 Drawing Figures

WIRE STRIPPING APPARATUS AND METHOD

This invention relates to a wire stripping apparatus and more particularly to an apparatus for loosening the cover of a wire to facilitate the removal of the cover from both twisted wires and cables.

Many devices have been made available for stripping the insulation from a wire. Most of these make use of the idea that the insulation may be stripped from a wire by cutting the insulation around the periphery of the wire and then sliding the severed covering from the remainder of the wire off the end thereof. This arrangement works nicely when the wire to be stripped is fairly straight and the insulation and wire core are substantially parallel with respect to each other along the length of the wire from which the insulation is to be removed.

However, in today's complex electronics equipment, wires of many configurations are utilized. Among these are twisted pairs of wire in which each wire of the twisted pair has a solid conductor surrounded by a plastic coating which may be heat shrunk or includes a third layer of nylon or the like which is heat shrunk over the plastic insulation. These wires are fairly hard and manual untwisting of these by an operator usually leaves humps and bends in the wire such that removal of the insulation by a pair of conventional wire stripping pliers or the like, having blades therein which clamp over the wire to pierce the insulation and then sliding the blades over the inner conductor to push the insulation or covering off the end of the wire results in nicking or otherwise cutting into the conductive inner core at the various bumps and hills in the untwisted wire. Presently, there are no means available which conveniently and reliably strip insulation from such a wire configuration without introducing an impairment to the integrity of the inner wire conductive core.

Another wire arrangement which has met universal use is a wire in which there is a twisted pair including a third ground conductor which is uninsulated surrounded by a wire braided shield covering which in turn is surrounded by a plastic heat shrunk insulation coating covering over the entire configuration. The heat shrunk covering squeezes the twisted pair and braiding together such that the outer shape of the covering takes on a shape which outlines the twisted pair. As a result conventional wire stripping devices which surround the wire covering with a blade and penetrate the covering to a depth whereby the covering can then be pushed off the braided core usually end up nicking the braid and making it unsuitable for use in sophisticated applications.

The twisting arrangement of the outer covering over this type of cable is such that the depths of the hills and valleys of the covering are greater than the thickness of that covering, thus making it even impossible for conventional wire strippers to penetrate and cut around the entire circumference of the cable outer covering due to its eliptical rather than circular shape. These same variations in the outer covering shape also make it extremely difficult to slide the covering off the inner core.

SUMMARY OF THE INVENTION

In accordance with the present invention the above-noted problems are resolved by an apparatus for facilitating removal of the covering from a length of wire along the longitudinal axis thereof. In this apparatus a first member is provided having a wire gripping surface causing the wire to roll thereon when the length of the wire is forced against and along the surface by a force normal to the longitudinal axis of the wire. A second member has a wire gripping surface for causing the wire to roll thereon when the length of wire is forced against and along the surface by a force normal to the longitudinal axis of the wire. Means are provided for disposing the surfaces of the members in facing spaced relationship and for moveably mounting at least one of the members for translating the surfaces with respect to each other. The surfaces are spaced from each other a distance less than the diameter of the wire then being operated on to stretch the covering when the wire is disposed between the surfaces so as to loosen the covering.

A feature of the invention is that when a pair of twisted wires are disposed between the surfaces, the wires are simultaneously straightened and untwisted while the covering thereof is loosened. This feature includes means for aligning the twisted wires to the surfaces for causing the wires to be inserted between the surfaces when one of the members is displaced in a given direction with respect to the other member. Each wire of the twisted wires is squeezed by the surfaces and is rotated between the surfaces by a rolling action loosening the covering thereof.

A method is also provided for loosening the covering on a wire which includes displacing a first wire gripping surface substantially parallel to a second wire gripping surface, disposing the two surfaces a distance apart less than the diameter of the wire, and inserting the wire along the length to be loosened between the surfaces so that the displacement rolls the wire between the surfaces.

IN THE DRAWINGS:

FIG. 1b illustrates a pair of twisted wires to be operated on by the apparatus of FIG. 1a;

DESCRIPTION OF THE INVENTION

Figure 1A:
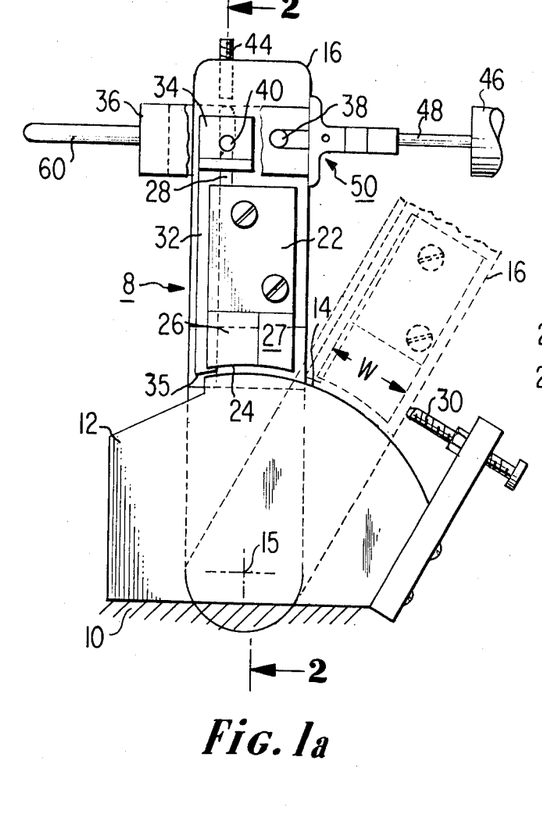
FIG. 1a is a front elevation view of an embodiment of an untwisting, straightening and cover loosening apparatus in accordance with the present invention.
Figure 2:
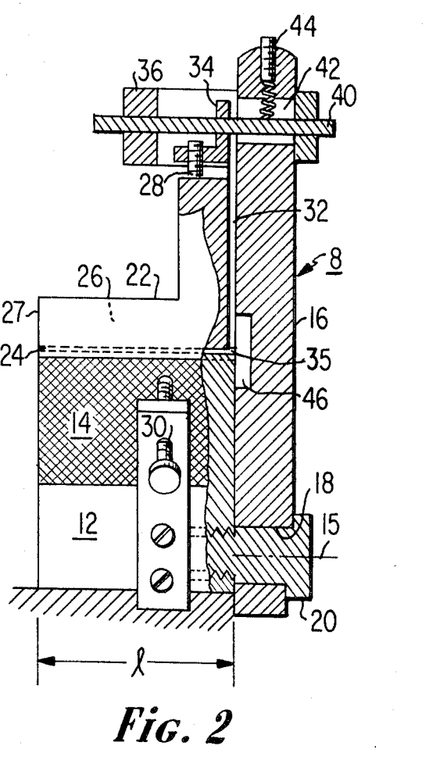
FIG. 2 is a cutaway side elevational view of the embodiment of FIG. 1a along lines 2—2.

In FIGS. 1 through 6g, like reference characters designate like or corresponding parts throughout the several views. In FIGS. 7 through 10, like reference numerals designate like or corresponding parts throughout these several views. In FIGS. 1a and 2, the apparatus 8 of the present invention is supported on suitable mounting means 10 in a conventional manner. Secured to the mounting means 10 is a platen 12 having an arcuate preferably knurled or otherwise roughened surface 14 which forms a segment of a cylinder whose longitudinal axis passes through pivot axis 15. Platen 12 is preferably made of a suitable metal.

Rotatably mounted to platen 12 is driving arm 16 which rotates about the pivot axis 15 on shoulder 18 of shoulder screw 20 which is screwed into platen 12, as shown. Arm 16 rotates between the position shown in solid and the position shown in phantom in FIG. 1a. Adjustably secured to driving arm 16 is pressure plate or shoe 22. Shoe 22 has an arcuate surface 24 which is formed from a segment of a cylinder whose longitudinal axis substantially coincides with pivot axis 15. Surface 24 is preferably knurled or roughened similarly as surface 14 of platen 12. Shoe 22 is adjusted on arm 16 by screws in a suitable manner toward and away from surface 14 to adjust the spacing g of surface 24 from surface 14. The spacing g between surface 14 and surface 24 is substantially uniform throughout. By making shoe 22 adjustable toward and away from pivot axis 15 to adjust the size of spacing g, various diameters of wires to be untwisted, straightened and have the covers loosened are accomodated. Shoe 22 has a leading edge 26 which tapers toward the front 27 of the shoe.

The length 1 of the respective shoe and platen knurled surfaces 14 and 24 is determined by the length of that portion of the twisted wires which is to be untwisted and straightened and eventually stripped of insulation. The size of the useful arc $\theta$ defined by surface 14 about axis 15 in FIG. 1a is at least twice as great as the arc defined by surface 24 as indicated by width W. These relationships are determined in a conventional manner by considering the diameter of the wire in the twisted pair which is to be rolled between the arcuate surfaces of the shoe 22 and platen 12 and the number of twists along length 1 (lay of wires).

Stop screw 30 is provided to adjust the starting position of driving arm 16 and shoe 22 as shown in phantom in FIG. 1a.

Figure 6A:
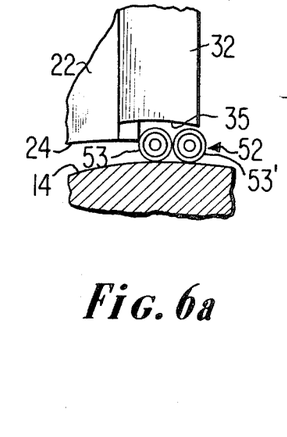
FIGS. 6a through 6g illustrate various operating stages of the embodiment of FIG. 1a and FIG. 2 useful for explaining the operation of the embodiment in accordance with the present invention.
Figure 6B:
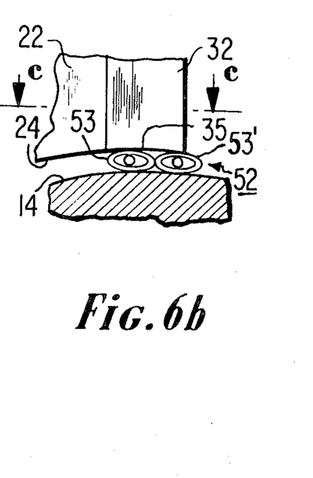
Figure 6C:
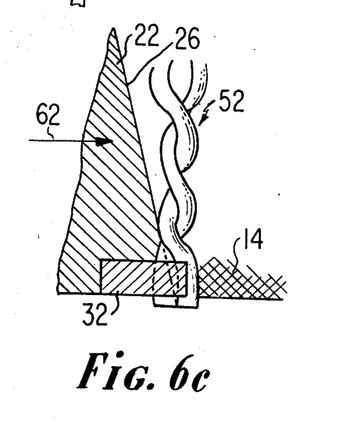

Disposed in a recess between vertical side wall 31 of shoe 22 and driving arm 16 is plunger 32 (see FIG. 6c). Plunger 32 has an arcuate bottom surface 35 which is knurled and which has an arcuate shape which follows that of arcuate surface 24 of shoe 22. Plunger 32 is suitably secured to L-shaped support 34 to which set screw 28 is threaded. Plunger 32 and its corresponding support 34 are resiliently moveable in a vertical direction up and down toward arcuate surface 14. Set screw 28 provides a stop for plunger 32 in this up-down motion.

Yoke 36 is provided to move plunger 32 in the vertical direction. Yoke 36 has a slotted end which pivots around a fixed pivot pin 38 for resiliently moving in a vertical direction moveable pin 40 within the confines of slotted aperture 42 in driving arm 16. Spring loaded retainer 44 which is a set screw and spring or, other suitable self contained spring loaded devices suitable for such an application resiliently forces pin 40 in a downward direction forcing set screw 28 against shoe 22. Pin 40 is closely secured to the vertical leg of support 34 so that any vertical motion of the pin 40 will cause a corresponding motion in support 34. A suitable recess 46 adjacent gap g is provided in driving arm 16 to receive the ends of twisted wires to be operated on in a manner to be described.

Drive arm 16 rotates about pivot axis 15 by a suitable mechanism connected to the arm. As shown, this is provided by air cylinder 46, having a shaft 48 coupled to suitable interconnecting mechanism 50.

Figure 1B:
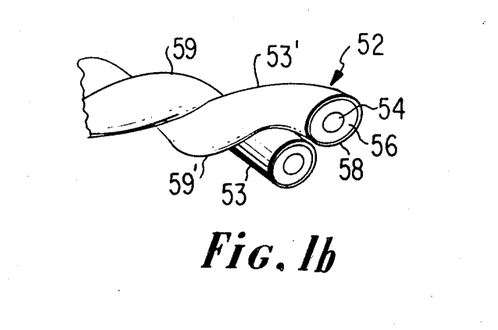

The apparatus described above as provided by the present invention untwines, straightens and loosens the outer covering of each wire of a set of twisted wires such as that illustrated by wire set 52 of FIG. 1b. Each wire 53, 53' of set 52 comprises a solid or stranded inner conductor 54, an outer insulating covering 56 and a heat shrunk nylon covering 58 which tightly encases insulation 56 about conductor 54. Conductor 54, while generally being pliable and soft is sufficiently hard and rigid so that the conductor takes the bend of the twist, as illustrated, in a somewhat permanent configuration.

In a wire stripping apparatus such as that used in the prior art, wires 53 and 53' need to be first untwisted so that the wire stripping devices may encircle each of the wires 53 and 53' separately, pierce and cut the insulation and then slide the insulation off solid conductor 54. However, the twist usually remains in each wire although untwisted, and the stripping tool undesirably nicks or cuts the rises of the conductor as it passes over the bend such as at points 59 and 59'.

To overcome this, the apparatus of the present invention not only untwists but straightens the wires eliminating the bends such as occur at points 59 and 59' and, at the same time, loosens along the desired length the covering comprising nylon covering 58 and insulating cover 56.

By loosening is meant that the nylon cover 58 is stretched or expanded so that it no longer compresses insulation 56 against the conductor 54. At the same time the bond, if any, between insulation 56 and conductor 54 is broken and, in some cases, insulation 56 is also stretched and expanded so that it is free of compressible contact with conductor 54. Thus, conductor 54 and insulation 56 and 58 are each no longer compressibly in contiguous relationship with each other as illustrated in FIG. 1b upon being processed by the apparatus of the present invention.

To operate the apparatus of the present invention, driving arm 16 of FIG. 1a is placed in the position indicated in phantom by air cylinder 46. Further explanation of the loosening process may be advantageously had by referring to FIG. 3 and FIG. 4 which illustrate the relative positon of the twisted wire with the apparatus. Further reference will be made with respect to the operation of this apparatus by referring to FIGS. 5 and 6a through 6g.

Figure 3:
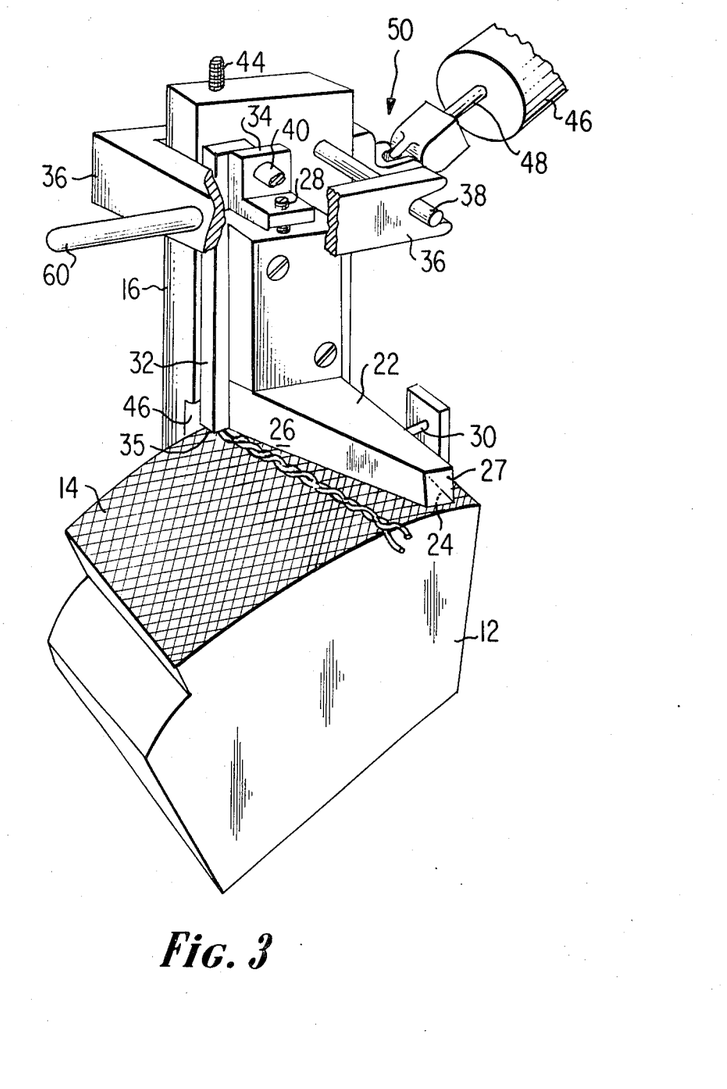
FIG. 3 is an isometric view of the apparatus of FIG. 1a and FIG. 2 with the twisted wires in place at the start of the untwisting and straightening operation.

In FIG. 3, driving arm 16 is shown at its extreme right position so that shoe 22 abuts against stop screw 30. Means, not shown, causes air cylinder 46 to so place the driving arm 16. An operator then raises up yoke 36 by way of handle 60. Yoke 36 is raised up about pivot pin 38 in a clockwise direction. Yoke 36 raises pin 40 which causes support 34 to be also lifted and which raises plunger 32 in an upward direction.

In the release or downward position, set screw 28 adjusts the position of surface 35 of plunger 32 with respect to knurled surface 14 of platen 12. Adjustment of screw 28 will raise or lower bottom surface 35 of plunger 32 with respect to surface 14. The gap between bottom surface 35 of plunger 32 and arcuate surface 14 is adjusted so as to compress the ends of the twisted pair of wires therebetween as illustrated in FIG. 6b.

In FIG. 6a an end view looking out of the drawing of FIG. 1a, plunger 32 is shown in its raised position with the ends of the twisted pair of wires 52 placed in the starting position. Plunger 32 is then released by the operator and moves in a downward position compressing the ends of the twisted pair of wires 52 against the arcuate surface 14 as shown in FIG. 6b.

While most of the twisted pair lies free of the apparatus as shown in FIG. 3, the ends, as illustrated in FIG. 6b, lie pressed under plunger 32 against surface 14. The ends of each wire 53 and 53' of the twisted pair are placed adjacent to each other along surface 14. The height of the plunger surface 35 and shoe surface 24 above arcuate surface 14 as provided by the present invention is less than the diameter of each of the wires which are typically of the same diameter and greater than the diameter of the inner conductor. Shoe 22 and plunger 32 compress the wires and distort them into an elliptical shape whose major axis is substantially parallel to the two arcuated surfaces 14 and 24 and whose minor axis is in a relatively normal direction to these surfaces.

This elongates the insulating covering at the major axis, stretches the insulation and if stretched beyond the yield point thereof, causes permanent deformation and expansion. This stretching of the insulation 56 has been found to break the bond thereof with the inner conductor 54 and is found to cause permanent deformation of the nylon outer covering 58 so as to thereby loosen the insulation from the inner conductor.

As shown in FIG. 6c which is a plan view along lines c–c of FIG. 6b, the twisted pair is disposed adjacent to tapered leading edge 26 of shoe 33. Shoe 22 is caused to rotate about axis 15 in the direction depicted by arrow 62. Edge 26 of the shoe 22 is tapered with respect to direction 62 as shown. This taper is provided to correspond to the lay of the twist of the twisted wires 52.

Figure 5:
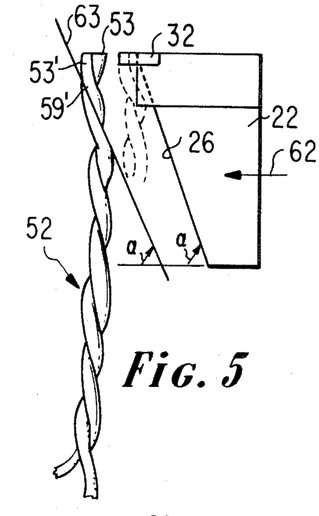
FIG. 5 is a plan schematic view of a portion of the apparatus of FIG. 1 showing the alignment of the twisted wires to the apparatus at the start of the operation.

Referring to FIG. 5, it can be seen that twisted wires 52 have a lay indicated by line 63. Line 63 forms an angle $\alpha$ with respect to the direction of rotation 62. It is seen that edge 26 of shoe 22 will pass over wire 53 while pushing against wire 53' adjacent to hump 59' of wire 53', wire pair 52 being shown in phantom adjacent shoe 22 in FIG. 5. This alignment of edge 26 with the lay of the twist of the twisted pair of wires 52 permits shoe 22, when actuated in direction 62, to unravel and untwist the wires, causing the wires to pass between the arcuate surfaces of shoe 22 and platen 12.

Thus plunger 32 retains the ends of each of the wires of pair 52 against the surface 14, permitting shoe 22 to compressibly engage the wires at the start of the operation simultaneously straightening, untwisting the wires and loosening the covering.

In accordance with the present invention surfaces 24 and 14 are sufficiently roughened, for example, knurled to grab the outer coverings of each of the wires so that when shoe 22 passes over surface 14 in the direction of arrow 62, the wires are rotated therewith.

This rotation insures that the covering of each of the wires is stretched completely around the wire periphery. At the same time, the rolling and squeezing action of the wires between these surfaces causes the inner conductor thereof to straighten out, substantially eliminating the bumps which would otherwise be present in the twisted wires.

It is to be understood that the degree of roughness of surfaces 14, 24 and 35 is determined in accordance with the characteristic of the corresponding outer covering of the wires to be rolled therebetween and the extent to which the wires are squeezed. For example, when the outer coverings are hard, durable, tough material such as nylon or Teflon, (a trademark of the duPont Corporation, Wilmington, Del.) then a knurled configuration is provided these surfaces to ensure rolling action of the wires as the elliptical shape of the compressed wires tends to cause the wires to slide rather than roll. However, it will occur to those skilled in the art that when the outer coverings of the wires to be rolled between these surfaces have a relatively high frictional surface such as certain rubbers and plastic materials, then the degree of roughness of surfaces 24, 14 and 35 may be correspondingly reduced.

Figure 4:
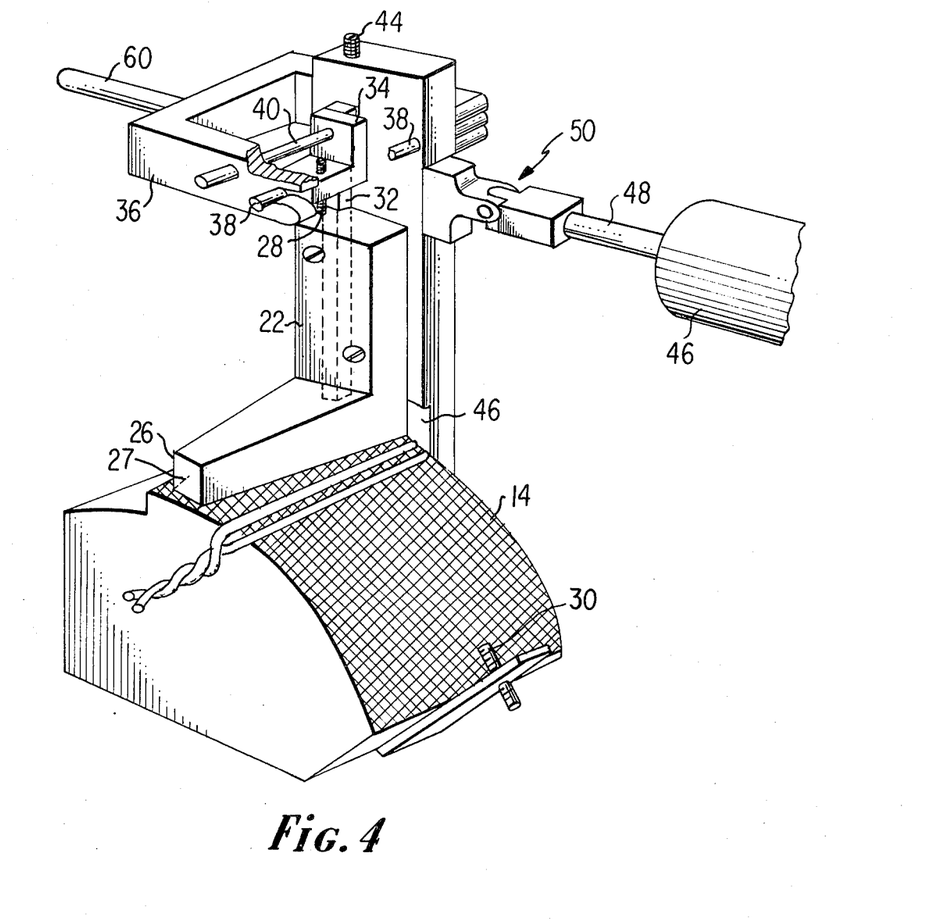
FIG. 4 is an isometric view of the apparatus of FIG. 3 at the end of the untwisting and straightening operation.
Figure 6D:
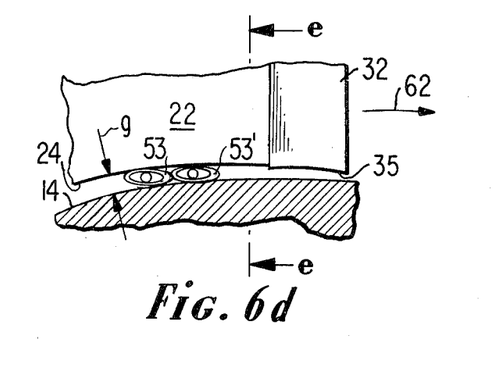
Figure 6E:
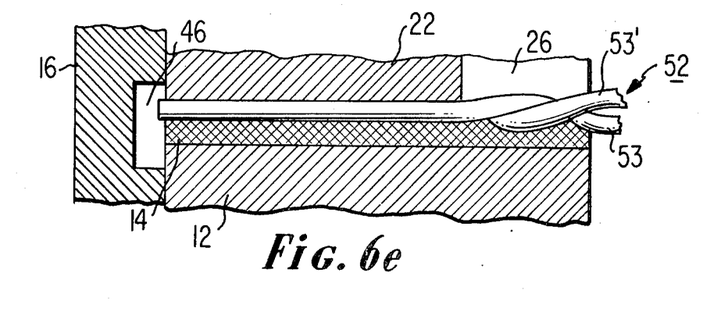

FIG. 6e is a cross sectional view along lines e–e of FIG. 6d through shoe 22 and platen 12 when shoe 22 is midway through its operating cycle from the position illustrated in FIG. 3 to the position illustrated in FIG. 4. As shown in FIG. 6d, the two wires lie adjacent to each other between the arcuate surfaces maintaining the elliptical configuration throughout when between these surfaces. As shown in FIG. 6e, that portion of the wires which are between the surfaces have been untwined and straightened while the remainder of the twisted wires extending out underneath the tapered portion of shoe 22 at edge 26 remain twisted.

Figures 6F, 6G, 7:
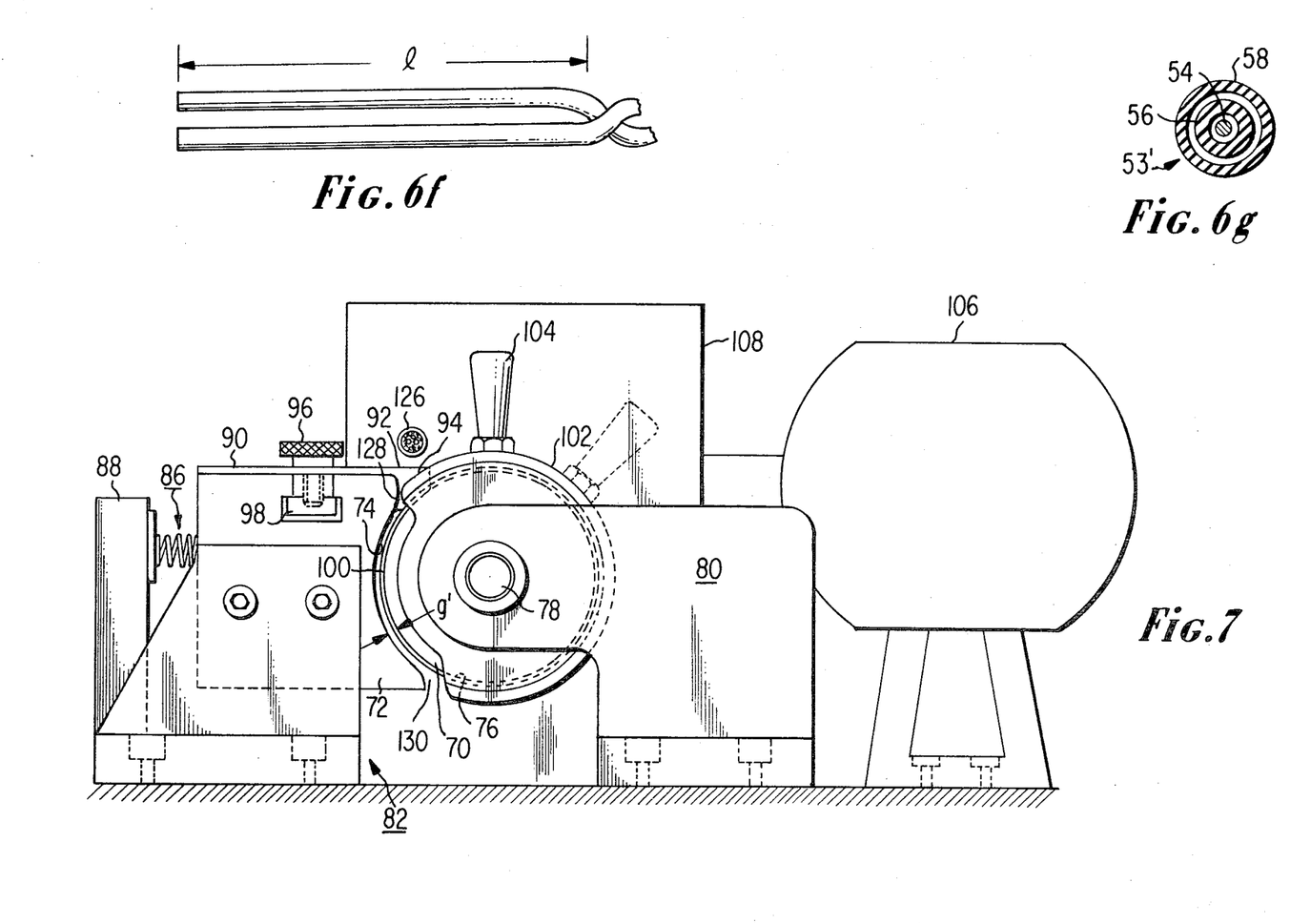
FIG. 7 is an end view of a second embodiment of an apparatus in accordance with the present invention.

In FIG. 6g there is an enlarged cross sectional view of one of the wires that has been processed by the apparatus in accordance with the present invention. As shown, the insulating coverings 58 and 56 are expanded and no longer compress against inner conductor 54. The relationship of the various layers of the wire has been exaggerated to illustrate the loosening effect of this apparatus on such a wire. That is the outer covering 58 is so enlarged that it may be slipped off insulation 56 without special tools.

Thus there has been shown an apparatus in accordance with the present invention in which a set of twisted wires are aligned with a pair of spaced members having facing oppositely disposed wire gripping surfaces thereon. The surfaces are spaced from each other a distance smaller than a diameter of the wires to be untwisted, the wires in a typical case being of substantially the same diameter. One of the members translates with respect to the other member rolling each of the wires in the gap between the two surfaces thereby untwisting and straightening each of the wires and loosening the covering thereof. This rolling action is provided for the entire length of the wire from which is desired the outer covering to be removed.

Suitable wire stripping tools as known in the art are then applied to the wires along this length to thereby pierce the insulation and slide insulation 56 and 58 off inner core 54. These stripping tools are well known and no further description thereof will be necessary.

In FIG. 7, there is illustrated another embodiment of an apparatus in accordance with the present invention.

This apparatus is provided to loosen the covering over a single cable facilitating the removal of the covering by manual or automatic means without the need for additional wire stripping tools. This apparatus comprises a rotatable cylindrical platen 70 having a knurled exterior surface 76 and a spring loaded pressure plate 72 having a concave surface 74 which is knurled and placed adjacent to and spaced from the exterior surface 76 of platen 70 a distance $g'$.

Surfaces 74 and 76 are substantially concentric. Platen 70 is mounted on shaft 78 to support 80 by suitable bearings. Pressure plate 72 is suitably mounted by mounts 82, 84 (FIG. 8), so as to resiliently slide toward and away from the outer surface of platen 70 in a horizontal direction along ways, not shown. Plate 72 is spring loaded by spring means 86 abutted against fixed support 88. While only one support 88 and accompanying spring means 86 is shown for simplicity, in practice more than one are provided. Both plate 72 and platen 70 are made of a suitable metal on which surfaces 74 and 76 are preferably knurled or otherwise roughened to grip a wire whose covering is to be loosened along a length $l'$.

Mounted in slidable relation with the upper surface of plate 72 is stop 90. Stop 90 is a thin sheet of metal formed, as shown, having a stop finger 92 which extends in the space 94 between the knurled surfaces of plate 74 and platen 70. Stop 90 is slidable along the top surface of plate 72 by means of screw 96 and nut 98 disposed in plate 72 which arrangement is provided in a conventional manner to slidably adjust slide stop 90 in the direction along the longitudinal axis of platen 70.

Secured at one end of platen 70 is blade 100. Blade 100 is preferably made of metal for cutting the insulation of a covering on a wire which is to be loosened and removed. Blade 100 extends around he entire periphery of platen 70 in a rib-like manner protruding above the knurled surface several mils in accordance with the thickness of the covering to be pierced. Surrounding the major portion of the periphery of platen 70 is operator protective shield 102 which has a knob thereon 104 secured in a suitable manner for rotating the shield about shaft 78 to which the shield is rotatably mounted in a conventional manner. The shield 102 is made of metal or any other suitable material. Platen 70 is rotated in a counterclockwise direction in view of FIG. 7 by motor 106 through gear box 108 which is coupled to platen 70 by way of coupler 110 and shaft 112 which drives platen 70 in the given direction. Shield 102 has a plurality of spaced slots 14 which are adapted to receive therein stop finger 92.

Figure 9A:
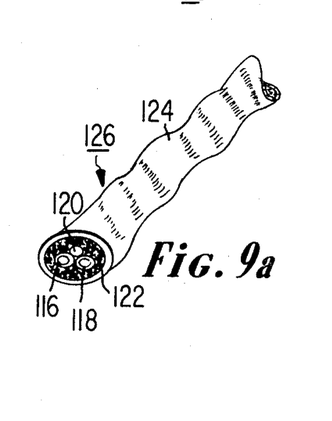
FIGS. 9a through 9c illustrate a wire cable capable of having its cover loosened for stripping by the apparatus of FIG. 7 and FIG. 8.
Figures 9B, 9C, 10:
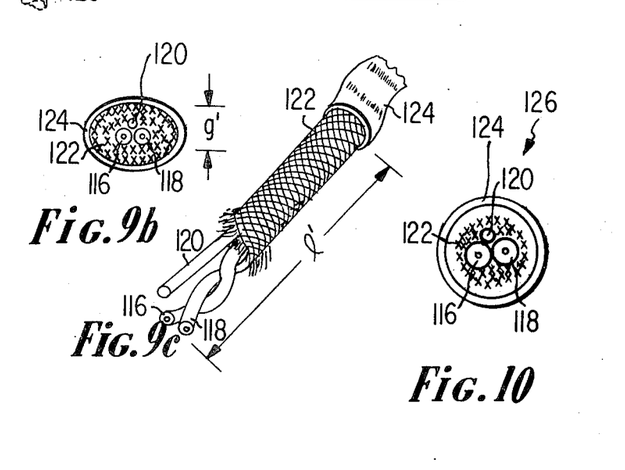
FIG. 10 illustrates an end view of the cable of FIG. 9a after having been processed by the apparatus of FIG. 7 and FIG. 8.

The type of wire which the apparatus of FIG. 7a has been found to be especially suitable for stripping the covering thereof is illustrated in FIGS. 9a, 9b and 9c. This type of wire has a twisted pair of wires 116 and 118, and adjacent thereto, a solid uninsulated conductor 120. Conductor 120 and twisted wires 116 and 118 are surrounded by a braid 122. Covering the braid and completing the cable is a shrunk fit covering 124 made of plastic or other suitable materials as known in the cable making art. Due to the twisted configuration of wires 116 and 118, the covering 124 takes on a twisted, bumpy, hilly configuration in which the peaks and valleys thereof may vary a greater distance than the thickness of the covering. Thus, it is almost virtually impossible to strip the cable by conventional wire stripping techniques using a blade which surrounds, penetrates and cuts the covering thereof without cutting, digging or otherwise damaging the braid 122.

Figure 8:
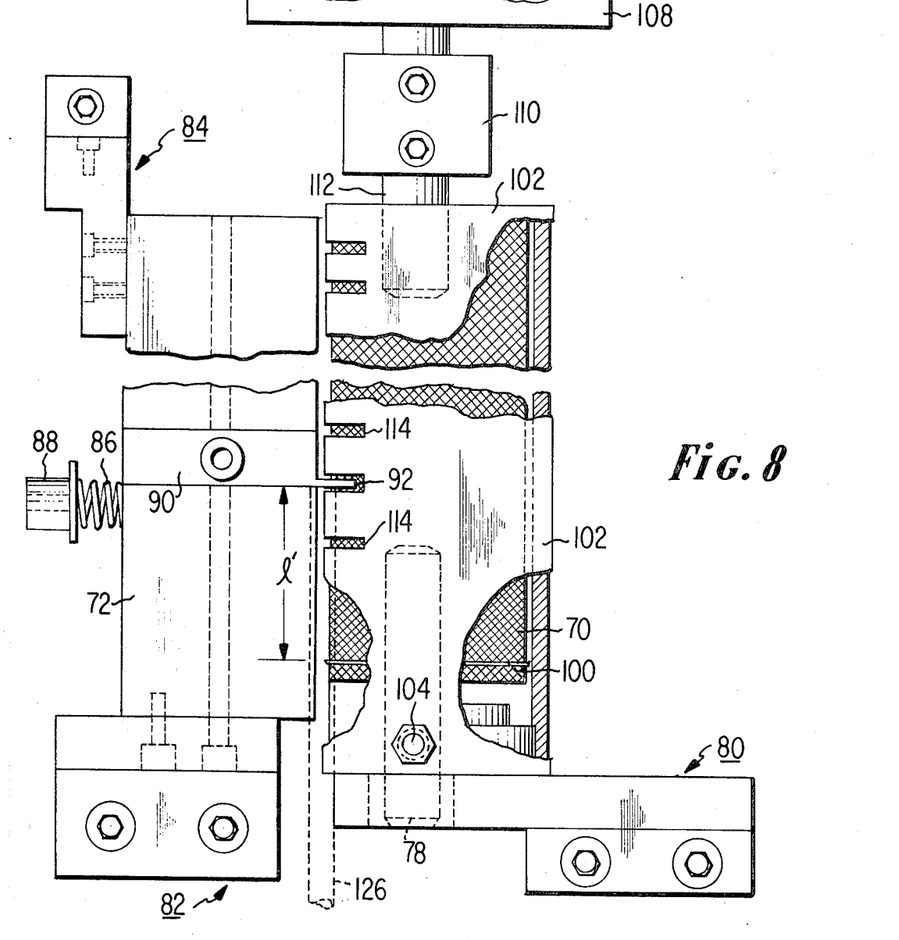
FIG. 8 shows a plan view of the apparatus of FIG. 7.

In accordance with the present invention a suitable length of covering 124 can be removed without damaging braid 122 as shown in FIG. 9c by the apparatus of FIGS. 7 and 8.

In operation, cable 126 of the type described in FIGS. 9a, 9b and 9c is inserted longitudinally by laying the cable as shown in phantom in FIG. 8 between surfaces 74 and 76 of the pressure plate and platen, respectively.

To permit insertion of the cable 126 between these surfaces, portion 128 of plate 72 is formed so as to uniformly taper away from its concentric relationship with platen 70 as shown. This tapering arrangement causes surfaces 74 and 76 to form a funnel-like channel in the counterclockwise direction along the longitudinal direction of platen 70.

Cable 126 is placed into this channel on top of shield 102 with the end of the cable abutting against stop finger 92. The length $l'$ defines the distance between the nearest surface of stop 92 and blade 100. It is this length of the cable to which the outer covering thereof 124 will eventually be loosened and removed by this apparatus. In operation, the platen 70 rotates in a counterclockwise direction so as to rotate in a downward direction with respect to surface 74 in the view of FIG. 7.

Gap $g'$, as shown at FIG. 7 between surfaces 76 and 74 of the platen and plate, respectively, is uniformly provided around the periphery of platen 70 and along the longitudinal axis thereof. This gap is provided less than the diameter of the cable 124 at its minimum point, that is, the ellipitcal axis as shown in FIG. 9b has a minor axis and a major axis, where gap $g'$ is smaller than the minor axis of the cable of FIG. 9b. The pressure provided by the spring loading means 86 is suitably adjusted for different diameter cables, thus permitting a wide variety of diameter cables to be conveniently utilized by this mechanism. The pressure provided by spring means 86 is sufficiently high to provide the loosening operation, for example, 100 lbs. per sq. inch of pressure has been found to be suitable in an actual operating mechanism.

Once having inserted cable 136 in the channel formed by tapered portion 128 and surface 76 of platen 70, motor 106 is turned on causing platen 70 to rotate in a counterclockwise direction. The operator then grasps handle 104 rotating the shield 102 in a clockwise direction as shown in FIGS. 6 and 7 in phantom so that the cable will then drop into the space between surfaces 76 and 74 while platen 76 is rotating. Gravity returns the handle to its original position while the cable is then being drawn into gap $g'$, is rolled therein, and emerges at the bottom thereof at location 130.

The squeezing and rolling action of the platen against the plate with the cable therebetween, stretches the outer covering forming an even further ellipitical shape as illustrated for the wires of FIG. 6a to 6d. This distortion stretches the outer covering thereby expanding it and forming a generally expanded cylindrical shape when the covering is relaxed, eliminating the hills and the bumps of the cable periphery in the outer covering 124 as illustrated in FIG. 10. This outer cable covering has a configuration illustrated in FIG. 10, FIG. 10 being an end view of a cable processed through this apparatus. The distortion and expansion of the outer covering 124 of cable 126 and the simultaneous piercing of the insulation by blade 100 permits outer covering 124 of cable 126 along length 1' to be readily slipped off braided inner core. This slipping action can be provided by a human operator or a machine whichever is conveniently suitable for a particular application. Gripping surfaces 76 and 74 being knurled or otherwise roughened grip the outer covering 124 of cable 126 causing the cable to roll between the surfaces as platen 70 rotates. This rolling action ensures the entire cable periphery is subjected to the major axis of the ellispe formed by the squeezing action, subjecting the entire periphery around the circumference of the cable to both squeezing and stretching.

Therefore, in accordance with the second embodiment, an apparatus has been shown which is provided with first and second gripping surfaces which translate with respect to each other for squeezing and loosening the outer covering on a cable having a twisted pair surrounded by a braided covering encased in a plastic shrunk fitted insulation material. Insertion means are provided for permitting the cable to be inserted between the surfaces along the entire length of the cable in which the outer covering thereof is to be loosened and removed.

What is claimed is:

1. An apparatus for facilitating the removal of a covering from a length of wire along the longitudinal axis thereof, comprising:
   a first member having a wire gripping surface causing said wire to roll thereon when said length of wire is forced against and along said surface by a force normal to said axis,
   a second member having a wire gripping surface for causing said wire to roll thereon when said length of wire is forced against and along said surface by a force normal to said axis,
   means connected to said members for disposing said surfaces in facing spaced relationship and for moveably mounting at least one of said members for translating said surfaces with respect to each other, said connecting means including means for spacing said surfaces from each other a distance less than the diameter of said wire to stretch said covering when said wire is disposed between said surfaces so as to loosen said covering, and
   wire insertion means coupled to said members for causing said wire to be inserted between said surfaces when said surfaces are translated in a given direction,
   said insertion means including wire clamping means coupled to one of said members for clamping said wire against the gripping surface of the other member adjacent said spaced surfaces for forcing said wire between said surfaces when said surfaces are translated with respect to each other in said given direction.

2. An apparatus for facilitating the removal of the covering on each wire from a length of twisted wires, comprising:
   first and second members each having a surface for gripping said wire along said length,
   means coupled to said members for disposing said wire gripping surfaces in facing spaced relationship so as to squeeze each of said twisted wires when disposed between said surfaces to simultaneously straighten and untwist the wires and loosen the covering thereof and including means for displacing one member with respect to the other member in a given direction so as to rotate the wires disposed between said surfaces, and
   aligning means coupled to said members for aligning said twisted wires to said surfaces for causing said wires to be inserted between said surfaces when said one member is displaced in said given direction.

3. The apparatus of claim 2 wherein said displacing means includes means for fixedly mounting said first member and means for movably mounting said second member.

4. The apparatus of claim 2 wherein each of said gripping surfaces are roughened.

5. The apparatus of claim 2 wherein said aligning means includes a resiliently mounted plunger connected to said second member at an edge of the second member wire gripping surface to compress an end of said twisted wires against the wire gripping surface of the first member at said edge, said edge being disposed at an angle with respect to said given direction, said angle substantially coinciding with the lay of the twist angle of the wires then being untwisted.

6. The apparatus of claim 2 being arranged to straighten and loosen the covering of a plurality of sets of twisted wires, the wires of each set having the same diameter different from the diameter of the wires of the other sets, said gripping surface spacing means including adjustable means for spacing and gripping surfaces a distance less than the diameter of the covering of the twisted wires then being straightened.

7. The apparatus of claim 2 wherein said wires have a conductive core of a given diameter said wire gripping surfaces spacing means including means for adjusting the spacing of said surfaces a distance less than the diameter of the covering of the wire then being straightened and greater than the diameter of said core thereby untwisting and straightening the twisted core while loosening said covering when said wires are rotated between said surfaces.

8. An apparatus for facilitating the removal of the covering on each wire from a length of twisted wires, comprising;
   first and second members each having an arcuate wire gripping surface for gripping said wire along the length thereof, the surface of said first member being convex and the surface of the second member being concave,
   means coupled to said members for disposing said surfaces in facing spacing relationship and including means for rotating said second member about said first member for displacing said surfaces with respect to each other, and
   aligning means coupled to said members for aligning said length of twisted wire to said spaced surfaces for causing said length to be laterally inserted between said surfaces when said second member is rotated about said first member in a direction toward said aligned wires.

9. The apparatus of claim 8 wherein said second member has a leading edge disposed at an angle with said direction, said angle coinciding substantially with the lay of the twist of said twisted wires aligned with said leading edge.

10. The method of loosening a covering on each wire of a set of twisted wires to facilitate the removal of the covering, comprising:

clamping each wire of the set at the same end of the set between first and second wire gripping surfaces, spacing said surfaces that distance from each other by which each wire is contiguous with and squeezed by said surfaces when disposed therebetween, and     translating one surface with respect to the other surface toward the clamped set of wires to roll the wires between the surfaces to untwist, straighten and loosen the covering thereof.

11. The method of claim 10 further including the step of aligning the lay of the twist of the wires substantially parallel to the edge of the surface to be translated to insert one wire at a time between said surfaces.

12. A method of loosening cable insulation surrounding a braided conductive covering on a twisted pair of wires, comprising:

displacing a first wire gripping surface substantially parallel to a second wire gripping surface,     disposing the two surfaces a distance apart less than the minimum outer diameter of the insulation to squeeze and elongate said insulation when said cable is inserted therebetween, and     inserting the cable along the length of the insulation to be loosened between said surfaces so that said displacement rolls said length between said surfaces, elongating said insulation across the cable diameter along said length.

\* \* \* \* \*